United States Patent
Ooyama et al.

(10) Patent No.: US 7,862,273 B2
(45) Date of Patent: Jan. 4, 2011

(54) PART MOUNTING MECHANISM

(75) Inventors: Kenji Ooyama, Kanagawa (JP); Takeshi Kuroda, Kanagawa (JP); Oomi Arisaka, Kanagawa (JP)

(73) Assignee: Piolax Inc., Yokohama-shi, Kanagawa (JP)

( * ) Notice: Subject to any disclaimer, the term of this patent is extended or adjusted under 35 U.S.C. 154(b) by 1000 days.

(21) Appl. No.: 11/704,243

(22) Filed: Feb. 9, 2007

(65) Prior Publication Data
US 2007/0189875 A1    Aug. 16, 2007

(30) Foreign Application Priority Data
Feb. 10, 2006    (JP)    ............... P2006-033772

(51) Int. Cl.
*F16B 13/04*    (2006.01)
*F16B 19/00*    (2006.01)
(52) U.S. Cl. .............. 411/45; 411/46; 411/47; 411/48; 411/508; 411/509; 411/510; 411/913
(58) Field of Classification Search .......... 411/45–48, 411/508–510, 913
See application file for complete search history.

(56) References Cited

U.S. PATENT DOCUMENTS

| 5,367,751 | A | * | 11/1994 | DeWitt ..................... 24/295 |
| 6,074,150 | A | * | 6/2000 | Shinozaki et al. .......... 411/508 |
| 6,405,413 | B2 | * | 6/2002 | Ichimaru et al. ............ 24/297 |
| 6,449,814 | B1 | * | 9/2002 | Dinsmore et al. ........... 24/297 |
| 6,665,914 | B2 | * | 12/2003 | Ogawa ..................... 24/297 |
| 7,300,089 | B2 | * | 11/2007 | Kuroda ................... 296/39.1 |

FOREIGN PATENT DOCUMENTS

| JP | 61-138746 | 8/1986 |
| JP | 2932388 | 5/1999 |

* cited by examiner

*Primary Examiner*—David Reese
(74) *Attorney, Agent, or Firm*—McGinn IP Law Group, PLLC

(57) ABSTRACT

A part mounting mechanism includes a boss, and a resin clip adapted to be assembled to the boss. The resin clip includes holding pieces, elastic engagement pieces, and a connecting portion. The part mounting mechanism also includes projecting portions formed on facing inner surfaces of the connecting portion at predetermined intervals in a staggered fashion along a direction in which the boss is inserted. When the boss is inserted into the connecting portion, the projecting portions bite into the distal end portion of the boss.

9 Claims, 9 Drawing Sheets

PART MOUNTING MECHANISM

BACKGROUND OF THE INVENTION

1. Field of the Invention

The present invention relates to a part mounting mechanism which is used to fix a part such as an interior member to a support part such as a panel member of a motor vehicle on which the interior member is to be mounted.

2. Description of the Related Art

As a mounting mechanism for mounting an interior part or the like of a motor vehicle, JP-UM-A-61-138746 below discloses an interior part mounting construction in which an interior part on which a boss is provided to erect therefrom is mounted on a panel plate having a hole opened therein via a metallic clip. The metallic clip is formed into substantially a U-shape, and a pair of locking claws are formed at distal end portion of the metallic clip in such a manner as to be cut to be erected inwards from the distal portion in such a manner as to face each other, whereby when the boss is inserted between the locking claws, the locking claws are brought into elastic engagement with the boss, so that the metallic clip is mounted on the boss.

In addition, Japanese Patent No. 2932388 below discloses a part mounting construction in which a part on which a boss is provided to erect therefrom is mounted on a support member having a mounting hole formed therein via resin clip. The resin clip is formed into substantially a U-shape, and a locking leg piece is provided at a center between both side walls of the U-shaped clip via slits, projections being provided at proximal ends of side portions on both sides of the locking leg piece in such a manner as to project therefrom. The boss have outer rib walls provided to erect on both sides thereof along a direction in which the boss is inserted and a pair inner rib walls provided to erect inside the outer rib walls. Then, the resin clip is assembled on to the boss and is then inserted into the mounting hole, the side portions of the resin clip are pressed against inwards, whereby the projections thereon are caused to bite into the outer rib walls and the inner rib walls, respectively, and the boss mounted part is fixed to the support member via the resin clip.

SUMMARY OF THE INVENTION

In the case of JP-UM-A-61-138746, since distal ends of the pair of locking claws which are bent inwards at the distal end portion of the metallic clip face each other in almost the same position and a space between the distal ends is narrow, there has existed a problem that it becomes difficult to insert the boss between the locking claws, thereby making it difficult to assemble the metallic clip on to the boss. In addition, when the metallic clip is fitted on the boss, there has been a possibility that the metallic clip is fitted on the boss while being inclined relative thereto. Furthermore, in the event that the panel plate is made of a metallic material, there have been cases where uncomfortable rubbing noise is produced when the metallic clip is pushed into the panel plate.

In the case of Japanese Patent No. 2932388, while the projections on the side portions of the resin clip bite into the rib walls of the boss, respectively, when the resin clip is inserted into an inner circumference of the mounting hole so that the resin clip is fixed to the boss strongly and rigidly, in such a state that the resin clip is assembled on to the boss which has not yet been inserted into the mounting hole, since the resin clip is only placed on the boss in such a manner as to hold the boss therebetween, there has been a possibility that the resin clip comes off from the boss before the resin clip is inserted into the mounting hole.

Consequently, an object of the invention is to provide a part mounting mechanism which can facilitate the assembly of the clip on to the boss, prevent the dislocation of the assembled clip from the boss and, furthermore, prevent the generation of rubbing noise when fixing a part to a support part.

With a view to attaining the object, according to a first aspect of the invention, there is provided a part mounting mechanism including: a boss formed on a part; and a resin clip which has a u-shape and adapted to be assembled to the boss, the resin clip including: holding pieces which hold the boss therebetween; elastic engagement pieces which are inserted into a mounting hole that is formed in a support part on which the boss is to be mounted; and a connecting portion which connects together proximal ends of the holding pieces and that of the elastic engagement pieces; and projecting portions formed on facing inner surfaces of the connecting portion at predetermined intervals in a staggered fashion along a direction in which the boss is inserted wherein: the resin clip is formed of a resin material which is harder than the boss; a space defined between a distal end of the projecting portion provided on one the inner surfaces and a distal end of the projecting portion provided on the other inner surface as viewed in the boss inserting direction becomes smaller than a thickness of a distal end portion of the boss; and when the boss is inserted into the connecting portion, the projecting portions bite into the distal end portion of the boss.

According to the invention, when the resin clip is placed on the boss, the projecting portions on the inner surfaces of the connecting portion bite into the distal end portion of the boss, whereby the resin clip can be assembled on to the boss. As this occurs, since the projecting portions are formed on the inner surfaces of the connecting portion in the staggered fashion, the resin clip can be placed on the boss smoothly with a relatively small effort, thereby the working properties of the assembling work being increased. In addition, since the projecting portions are formed in the staggered fashion at the predetermined intervals, the resin clip can be placed on the boss without being inclined in such a state that the posture of the resin clip is controlled, whereby the resin clip can be assembled on to the boss accurately without producing any assembling failure. Furthermore, since the projecting portions formed on the facing inner surfaces of the connecting portion in the staggered fashion bite into both the sides of the distal end portion of the boss, the resin clip can be assembled on to the boss without any looseness.

Then, by inserting the resin clip which is assembled on to the boss into the mounting hole in the support part, the elastic engagement pieces of the clip are brought into engagement with the mounting hole, so that the boss mounted part can be fixed to the support part via the resin clip.

In addition, since the resin clip is adopted in the invention, even when the support part is such as to be a metallic panel member, the generation of uncomfortable rubbing noise can be prevented which would otherwise be the case when the metallic clip is inserted into the mounting hole therein.

According to a second aspect of the invention, there is provided a part mounting mechanism according to the first aspect of the invention, further including: a notch provided in one of a front and rear walls of the connecting portion, the front and rear walls facing each other in a direction in which the boss is held therebetween; a cut hole provided in another one of the front and rear walls; and side walls for connecting sides of the front and rear walls.

According to the invention, since the notch or cut hole is provided in the connecting portion, the distal end portion of the boss becomes visible through the notch or cut hole when the resin clip is mounted on the boss, thereby making it possible to confirm whether or not the resin clip is assembled on to the boss in a perfect fashion. Consequently, the assembling work of the resin clip on to the boss can be carried out in an ensured fashion.

In addition, since the front and rear walls in which the notch or cut hole is provided are connected together by the side walls, the rigidity of the connecting portion can be increased. As a result, the projecting portions provided on the connecting portion bite into the distal end portion of the boss effectively, and since once the projecting portions bite into the distal portion of the boss, the resin clip is brought into engagement with the boss with a strong force, the dislocation of the resin clip from the boss in such a state that the former is temporarily assembled on to the latter can be prevented, or the dislodgement of the boss mounted part, which is fixed to the support part, from the support part can be prevented which results from the dislocation of the boss from the resin clip when the boss mounted part is pulled.

According to a third aspect of the invention, there is provided a part mounting mechanism according to the first or second aspect of the invention, further including: projections provided on side surfaces of the holding pieces which extend along the direction in which the boss is held therebetween; and a fixed wall provided on the boss, in a position where the projections are brought into sliding contact therewith when the resin clip deflects inwards; wherein when the resin clip is assembled on to the boss and is then inserted into the mounting hole in the support part, the holding pieces are pressed against by an inner circumference of the mounting hole to thereby be deflected inwards, so that the projections bite into the fixed wall provided on the boss.

According to the invention, when the resin clip is assembled on to the boss and is then inserted into the mounting hole in the support part, the holding pieces are pressed against by the inner circumference of the mounting hole to thereby be deflected inwards, and the projections provided on the holding pieces bite into the fixed wall provided on the boss, whereby the resin clip is fixed to the boss strongly and rigidly. Therefore, the dislodgement of the boss mounted part, which is fixed to the support part, from the support part can be prevented which results when the boss mounted part is pulled.

According to a fourth aspect of the invention, there is provided a part mounting mechanism according to the third aspect of the invention, wherein: the fixed wall of the boss includes: a pair of outer walls which are provided to erect along an axial direction of the boss; and a pair of inner walls which are provided inside the outer walls at predetermined intervals to erect in parallel to the outer walls; the holding pieces are each made up of a pair of piece elements which are formed on both sides of the corresponding elastic engagement piece via slits and whose distal ends are separated from each other, and projections are provided on both side surfaces of each of the pair of piece elements which extend in a direction in which the boss is held therebetween in such a manner as to project therefrom, such that a maximum width defined by the projections which project from the both side surfaces of each piece element becomes larger than the interval between the outer wall and the inner wall; and when the resin clip is assembled on to the boss and is then inserted into the mounting hole in the support part, the respective piece elements of the holding pieces are pressed against to be deflected inwards and are allowed to enter between the outer walls and the inner walls of the boss, respectively, so that the projections on both the side surfaces of the individual element pieces bite into the outer walls and the inner walls of the boss, respectively.

According to the invention, since when the elastic engagement pieces of the resin clip are brought into engagement with the mounting hole, the respective piece elements of the holding pieces are deflected inwards so as to enter between the outer walls and the inner walls, respectively, whereby the respective projections on both the sides of the piece elements are allowed to bite into the outside walls and the inside walls, respectively, the resin clip can be fixed to the boss more strongly and rigidly.

In addition, since the respective distal ends of the pair of element pieces are separated from each other, so that each piece element is deflected independently, even in the event that there occurs a variation in dimension in the positions of the outer walls and the inner walls of the boss, the variation can be absorbed so that each piece element can be inserted between the outer wall and the inner wall in an ensured fashion, whereby the projections can be allowed to bite into the ribs, respectively.

According to the part mounting mechanism of the invention, since when the resin clip is placed on the boss, the projecting portions formed on the facing inner surfaces of the connecting portion in the staggered fashion bite into the sides of the distal end portion of the boss, respectively, the resin clip can be assembled on to the boss strongly and rigidly without any looseness. In addition, since the projecting portions are formed in the staggered fashion, the resin clip can be inserted with a relatively small effort and in a straight posture, whereby the resin clip can be assembled on to the boss easily and accurately. Additionally, since the resin clip is adopted, the generation of uncomfortable rubbing noise can be prevented which would otherwise be the case when the metallic clip is inserted into the mounting hole.

BRIEF DESCRIPTION OF THE DRAWINGS

These and other objects and advantages of this invention will become more fully apparent from the following detailed description taken with the accompanying drawings in which:

FIGS. 2A to 2C are diagrams showing a boss of the part mounting mechanism, in which FIG. 2A is a front view thereof, FIG. 2B is a sectional view taken along the line B-B and as viewed in a direction indicated by arrows attached to the line in Fig. FIG. 2A, and FIG. 2C is a sectional view taken along the line C-C and as viewed in a direction indicated by arrows attached to the line in FIG. 2A;

FIGS. 3A to 3C are diagrams showing a clip of the part mounting mechanism, in which FIG. 3A is a front view, FIG. 3B is a right side view, and FIG. 3C is a plan view of the part mounting mechanism;

DETAILED DESCRIPTION OF THE EMBODIMENTS

Hereinafter, a part mounting mechanism of the invention will be described by reference to the accompanying drawings.

Figure 1:
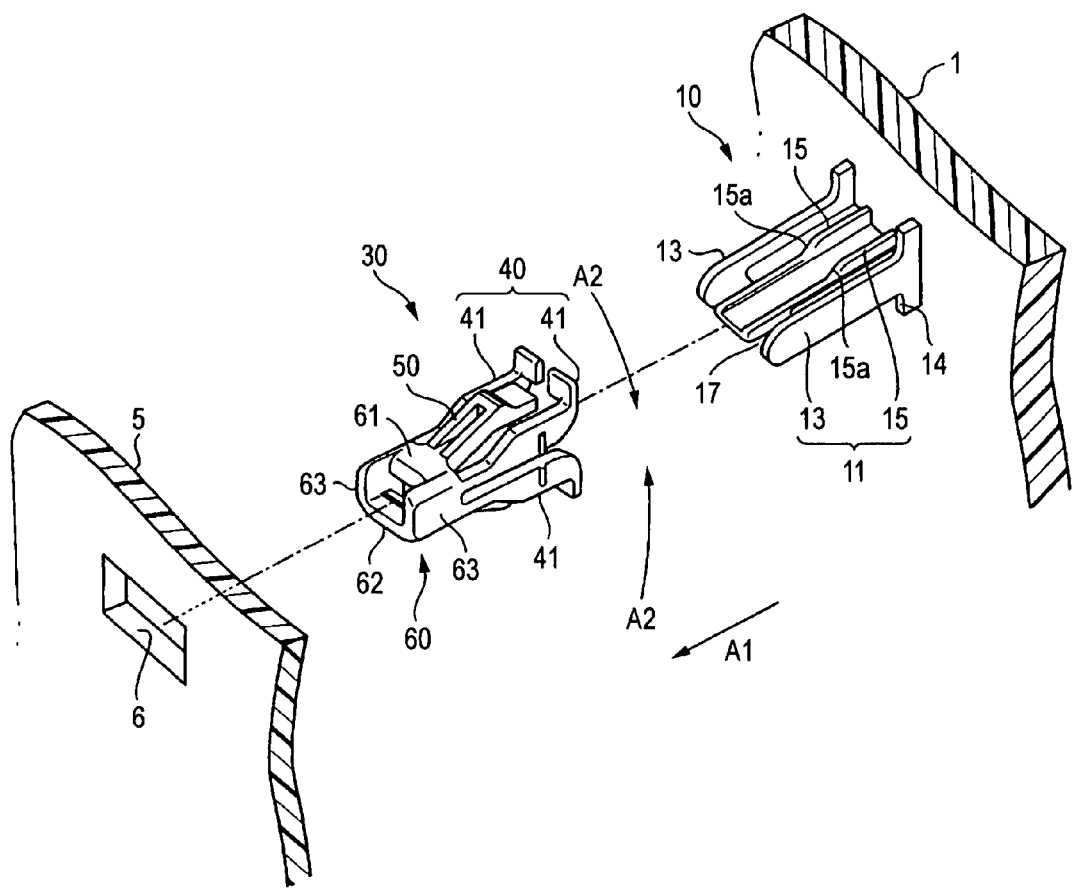
FIG. 1 is an exploded perspective view showing an embodiment of a part mounting mechanism of the invention.

As is shown in FIG. 1, in this part mounting mechanism (hereinafter, referred to as a "mounting mechanism"), a resin clip 30 (hereinafter, referred to as a "clip 30") is assembled on to a boss 10 which is provided in such a manner as to protrude from a rear surface side of a part such as an interior part, and the clip 30 is then inserted into a mounting hole 6 formed in a support part 5 such as a vehicle body panel or the like so that the clip 30 is fitted in the mounting hole 6, whereby the part 1 is fixed to the support part 5 via the clip 30.

Figure 2A:
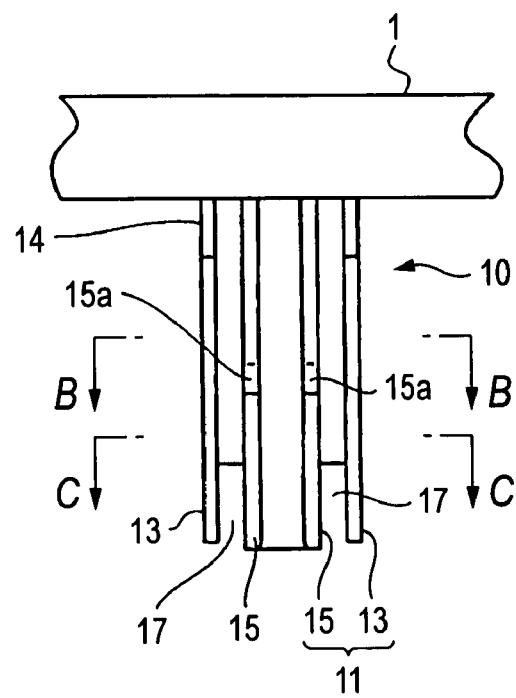
Figure 2B:
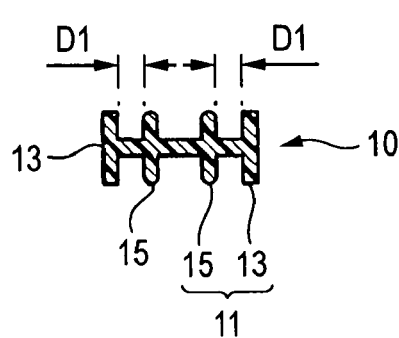
Figure 2C:
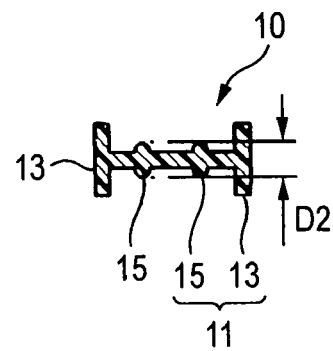

To describe these constituent members, as is shown in FIG. 1 and FIGS. 6 to 8, the boss 10 is provided in such a manner as to erect in a predetermined length from a rear surface of the part 1. Referring to FIGS. 2A to 2C, as well, a pair of rib-like outer walls 13, 13 are provided to erect along both side edges of the boss 10 in an axial direction thereof. A shoulder portion 14 is provided at a proximal portion end of each outer wall 13 in such a manner as to extend along the rear surface of the part 1, and the boss 10 exhibits substantially a T-shape as viewed from a side thereof. The shoulder portion 14 constitutes a portion which is brought into abutment with a circumferential edge on a front side of the mounting hole 6 in the support part 5. In addition, a pair of rib-like inner walls 15, 15 are provided to erect in parallel at a predetermined interval D1 (refer to FIG. 2B) inside the outer walls 13, 13 on both a front surface and a rear surface of the boss. The outer walls 13 and the inner walls 15 make up a fixed wall 11 of the invention.

Note that the inner wall 15 is not formed to extend over a full length of the boss 10 in the same height but is formed such that the height thereof is, as shown in FIG. 2C, reduced at a distal end and is, as shown in FIG. 2B, increased at a proximal end thereof via a tapered surface 15*a*. Also, note that a maximum thickness defined as extending from a top portion of the inner wall 15 provided to protrude from the front surface of the boss 10 to a top portion of the inner wall 15 provided to protrude from the rear surface thereof is made to be D2 (refer to FIG. 2C). In addition, a pair of slits 17, 17 are formed at a distal end portion f the boss 10 between the outer walls 13 and the inner walls 15 so that both side walls 63, 63 of a connecting portion 60, which will be described later on, enter the slits 17, 17, respectively, when the clip 30 is assembled on to the boss 10.

The boss 10, which has been described heretofore, is formed from a resin material such as polypropylene (PP).

On the other hand, the clip 30 is formed from a resin material which is harder than the boss 10, for example, a resin material such as polyacetal (polyoxymethylene, POM) and is formed such that it looks like a U-shape as a whole when viewed from a side thereof. Specifically speaking, the clip 30 has holding pieces 40 which are shaped to hold therebetween the boss 10 on both the surfaces thereof, elastic engagement pieces 50 which are inserted into the mounting hole 6 in the support part 5 for engagement and a connecting portion 60 which connects proximal ends of the holding pieces 40 and the elastic engagement pieces 50.

Figure 3A:
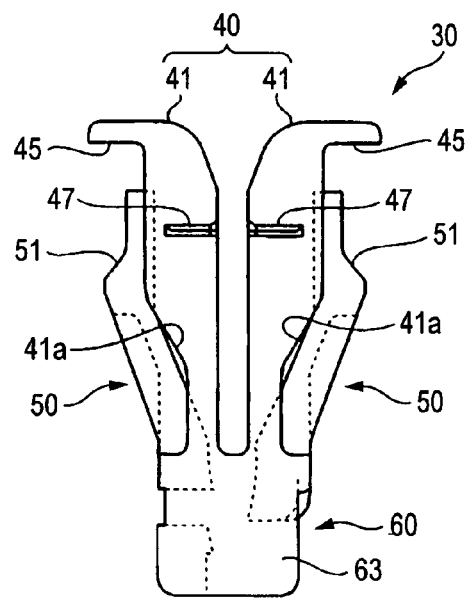
Figure 3B:
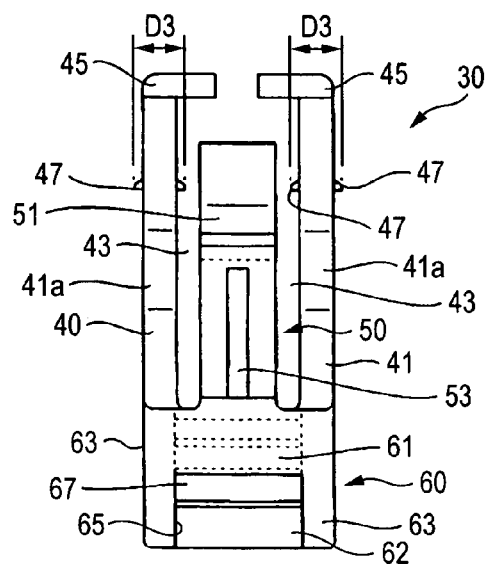
Figure 3C:
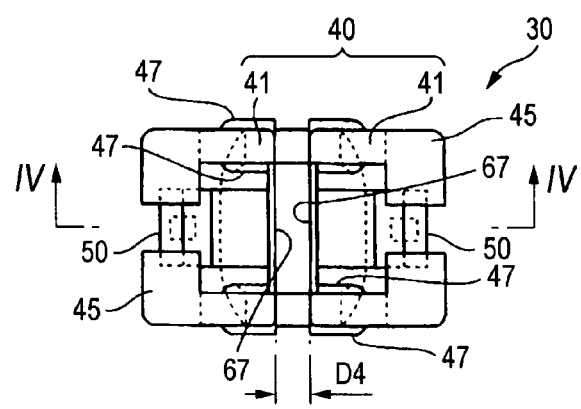

Referring to FIGS. 3A to 3C and 4, as well, each of the pair of holding pieces 40, 40 which define the U-shape of the clip 30 is disposed on both sides of the elastic engagement piece 50 via slits 43, 43, and is made up of a pair of piece elements 41, 41 which are shaped such that proximal ends are connected together to both sides of front and rear walls 61, 62 of the connecting portion 60, which will be described later on, and distal ends are separated from each other. As is shown in FIG. 3A, each of the piece elements 41, 41 is formed such that it extends from the connecting portion 60 in the same width at the distal end and increases the width via a tapered surface 41*a* in such a manner that the piece element 41 becomes wider at the distal end than at the proximal end.

Note that the piece elements 41, 41 can deflect independently relative to both the surfaces of the boss 10 by virtue of the slits 43 so as to hold the boss 10 therebetween. Furthermore, a thickness of each element piece 41 resulting in a direction in which the holding pieces 40 hold the boss 10 therebetween (refer to an arrow A1 in FIG. 1) is formed to be smaller than the interval D1 between the outer wall 13 and the inner wall 15 of the boss, so that the piece element 41 can enter between the outer wall 13 and the inner wall 15 when it deflects inwards largely.

A plate-like flange 45 is provided on each of the piece elements 41, 41 in such a manner as to protrude outwards from a distal end thereof relative to a direction in which the boss 10 is held. This flange 45 is brought into engagement with a circumferential edge of the front side of the mounting hole 6 when the clip 30 is inserted into the mounting hole 6 in the support part 5 to function to prevent the dislodgement of the clip 30 from the mounting hole 6.

Furthermore, projections 47, 47 are provided on both side surfaces of each of the piece elements 41, 41 which extend in the direction in which boss 10 is held in such a manner as to project therefrom, and a maximum width D3 (refer to FIG. 3B) defined as between the projection 47 which projects from the outer side surface and the projection which project from the inner side surface of the piece element 47 is set to be larger than the interval D between the outer wall 13 and the inner wall 15 of the boss 10 (refer to FIG. 2B). Due to this, when the clip 30 is inserted into the mounting hole 6 in the support part 5, whereby the piece element 41 is pressed against by an inner circumference of the mounting hole 6 to thereby be deflected inwards, the projections 47 on both the sides thereof are made to bite into the outer wall 13 and the inner wall 15 of the boss, respectively.

On the other hand, the elastic engagement piece 50 which is provided inside each holding piece 40 via the slits 43 is connected to an intermediate portion between the front and rear walls 61, 62 (which will be described later on) of the connecting portion 60 at the proximal end thereof. Then, the elastic engagement piece 50 protrudes from the intermediate portion obliquely outwards and descends inwardly via a stepped portion 51 to end up at a distal end which is provided to extend substantially parallel to a direction in which the boss 10 is inserted (refer to arrows A2 in FIG. 1). In addition, the elastic engagement piece 50 is formed to have a width which is smaller than a space between the two inner walls 15, 15 of the boss, so that the elastic engagement piece 50 is allowed to enter between the inner walls 15, 15 when inserted into the mounting hole 6 to thereby be deflected inwards largely. In addition, a cut groove 53 is provided in a predetermined depth from the proximal end of the elastic engagement piece 50 to the stepped portion 51 so as to aim at prevention of the generation of a sink mark at the time of molding.

Figure 4:
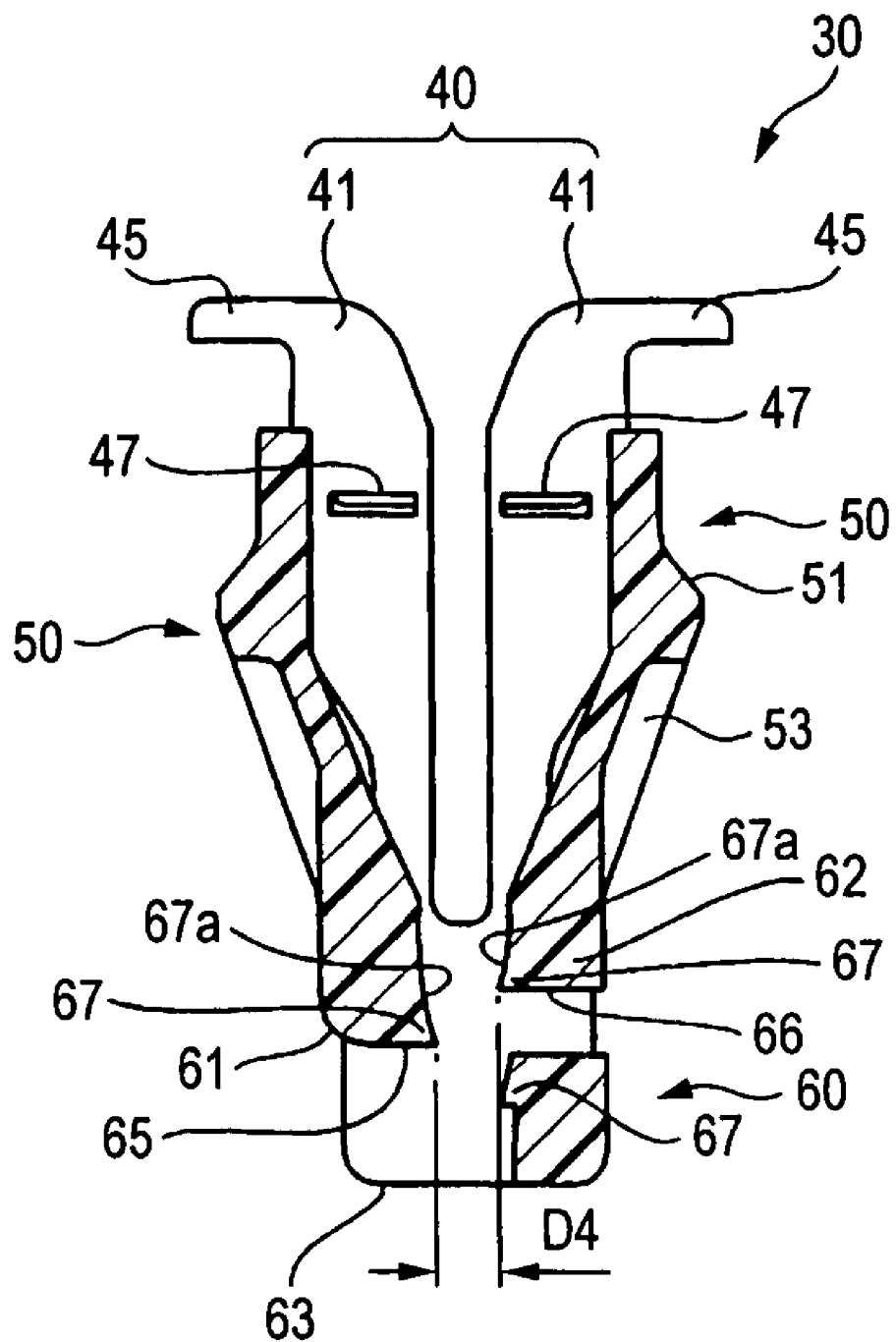
FIG. 4 is a sectional view of the clip taken along the line IV-IV and as viewed in a direction indicated by arrows attached thereto in FIGS. 3A to 3C.

To describe the connecting portion 60 where the holding pieces 40 and the elastic engagement pieces 50 are connected together at their proximal ends by reference to FIGS. 3A to 3C and 4, this connecting portion 60 is formed into a frame-like shape which can receive therein a distal end portion of the boss and which is made to open at a distal end thereof. Namely, the connecting portion 60 has the front wall 61 and the rear wall 62 which are situated to face each other in the direction in which the boss 10 is held and the pair of side walls 63, 63 which connect together both the sides of the front wall 61 and the rear wall 62. Referring to FIG. 4, as well, in the front wall 61, a notch 65 is formed to extend in a predetermined width from an end edge of an opening in the connecting portion 60. On the other hand, in the rear wall 62, a cut hole 66 of a predetermined width is provided in a position which does not overlap the notch 65 but lies above to be adjacent to the notch 65. Due to this, when the clip 30 is assembled on to the boss 10 completely, both sides of the distal end portion of the boss 10 are designed to become visible.

In addition, projecting portions 67 are formed on inner surfaces of the facing front wall 61 and rear wall 62 of the connecting portion 60 in such a manner as to be arranged along the direction in which the boss 10 is inserted in a staggered fashion at predetermined intervals. Namely, on the inner surface of the front wall 61, a projection 67 is provided to project from a position which is adjacent to an upper edge of the notch 65 and which faces the cut hole 66 in the rear wall 62. On the other hand, on the inner surface of the rear wall 62, two projecting portion 67 are provided to project from positions which do not overlap the projecting portion 67 on the front wall 61. Thus, the plurality of projecting portions 67 are formed on the inner surfaces of the facing front and rear walls 61, 62 of the connecting portion 60 in the staggered fashion.

In this embodiment, while one projecting portion 67 is formed on the front wall 61 and two projecting portions 67 are formed on the rear wall 62, the projecting portions 67 only have to be formed in the staggered fashion. For example, two projecting portions 67 may be formed on each of the front wall 61 and the rear wall 62 in the staggered fashion, or two projecting portions 67 may be formed on either of the front and rear walls 61, 62, while three projecting portion 67 may formed on the other in the staggered fashion.

In addition, a tapered surface 67a is provided on each projecting portion 67 which gradually increases its height as it extends along the direction in which the boss 10 is inserted, so as to facilitate the insertion of the distal end portion of the boss 10 into the connecting portion 60 when the clip 30 is assembled on to the boss 10. Furthermore, as is shown in FIGS. 3A to 3C and 4, a space D4 defined between a distal end of the projecting portion 67 on the inner surface of the front wall 61 and a distal end of the projecting portion 67 on the inner surface of the rear wall 62 as viewed from the direction in which the boss 10 is inserted is set to be smaller than the thickness D2 (refer to FIG. 2C) defined by the inner walls 15, 15 which are provided to protrude from both the sides of the distal end portion of the boss 10. Due to this, when the connecting portion 60 is placed on the distal end portion of the boss 10 in such a manner that the boss 10 is inserted into the connecting portion 60, the projecting portions 67 on the front and rear walls 61, 62 are allowed to bite into the inner walls 15 provided on both the sides of the distal end portion of the boss 10, respectively.

Next, the function of the clip 30, which is configured as has been described heretofore, will be described using FIGS. 5 to 9.

Firstly, the clip 30 is placed on the boss 10 in such a manner that the boss 10 is inserted into the clip 30 with the holding pieces 40 of the clip 30 aligned with the insides of the positions of the boss 10 where the outer walls 13, 13 thereof are provided to erect. Then, the distal end portion of the boss 10 is guided along the tapered surfaces 67a of the projecting portions 67 so as to be inserted into the connecting portion 60. As this occurs, in this invention, since the clip 30 is formed from the resin material which is harder than the boss 10 and additionally, the space D4 which is defined between the projecting portions 67 on the facing front wall 61 and rear wall 62 of the connecting portion 60 is set to be smaller than the thickness D2 (refer to FIG. 2C) of the distal end portion of the boss 10, when the boss 10 is inserted into the connecting portion 60, both the side surfaces of the boss 10 are pressed against by the projecting portions 67, and the projecting portions 67 are allowed to bite deep into the boss 10 in a thickness direction thereof.

Thus, since the projecting portions 67 which are provided on the inner surfaces of the connecting portion 60 in the staggered fashion are allowed to bite into both the sides of the distal end portion of the boss 10 at the predetermined intervals individually, when the clip 30 is mounted on the boss 10 in this way, the clip 30 can be assembled on to the boss strongly and rigidly without any looseness, and hence, there occurs no case where the clip 30 is dislodged from the boss 10 during transportation.

In addition, since the projecting portions 67 which are provided on the inner surfaces of the connecting portion 60 of the clip 30 are formed in the staggered fashion, there occurs no case where the space between the projecting portions 67 get narrow to an extreme extent as when the projecting portions 67 are provided in such a manner as to face each other in a line, and therefore, the clip 30 can be placed on the boss 10 in such a manner that the boss 10 is inserted into the connecting portion 60 thereof with a relatively small effort, thereby making it possible to increase the workability of the assembling work of the clip 30 on to the boss 10.

Furthermore, since the individual projecting portions 67 are formed at the predetermined intervals in the staggered fashion, the clip 30 can be placed on the boss 10 without being inclined in such a state that the posture thereof is controlled, and hence, there is caused no assembling failure, thereby making it possible to assemble the clip 30 on to the boss 10 accurately.

Figure 5:
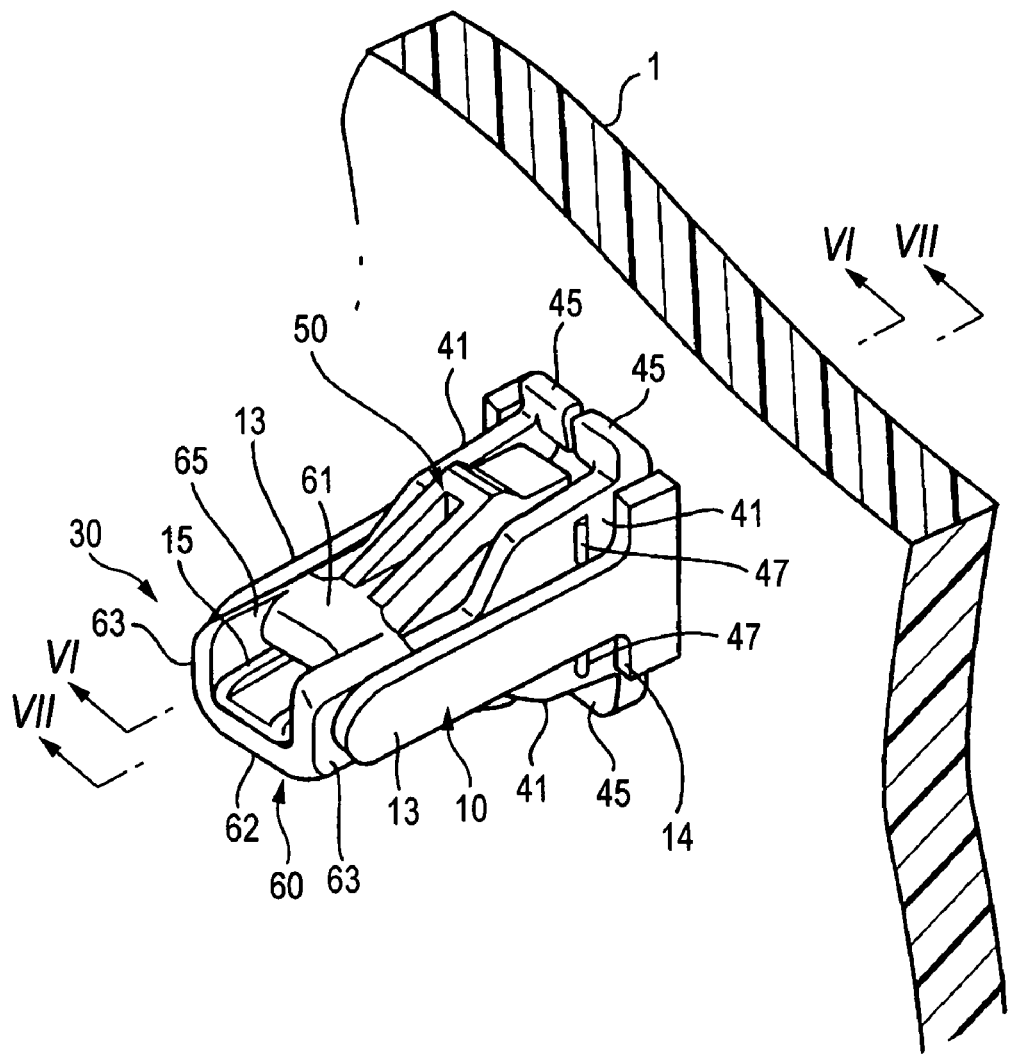
FIG. 5 is a perspective view showing a state in which the clip is assembled on the boss of the part mounting mechanism.
Figure 6:
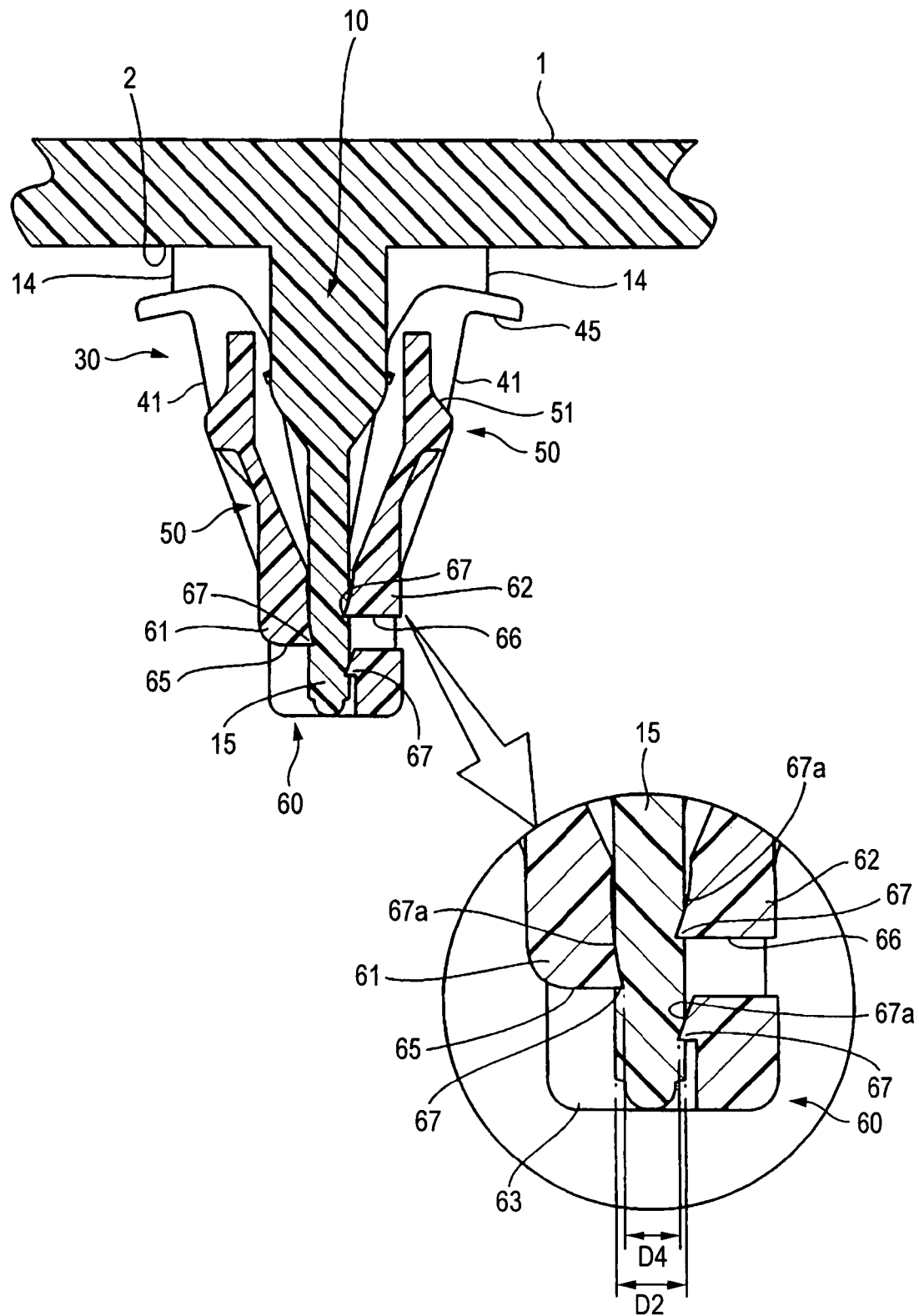
FIG. 6 is a sectional view taken along the line IV-IV and as viewed in a direction indicated by arrows attached thereto in FIG. 5.

On the other hand, since when the clip 30 is gradually placed on the boss 10 in such a manner that the boss 10 is inserted thereinto, the projections 47 provided on both the sides of each piece element 41 of the clip 30 ride on the tapered surface 41a formed on each inner wall 15, each piece element 41 is deflected outwards relative to the direction in which the boss 10 is held. Thus, as is shown in FIG. 5, the clip 30 is assembled on to the boss 10 completely with the piece elements 41 riding on the inner walls 15.

Figure 7:
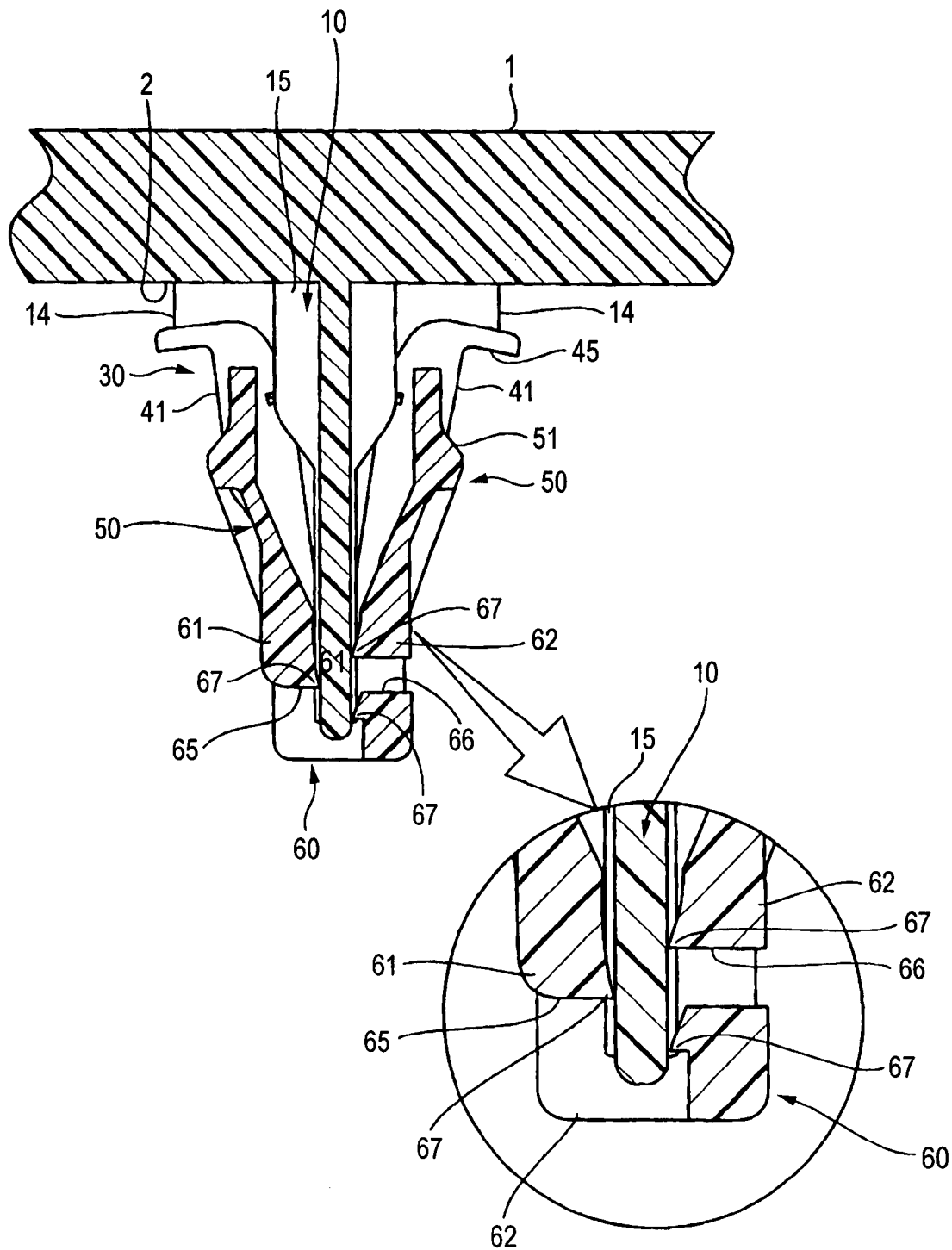
FIG. 7 is a sectional view taken along the line IIV-IIV and as viewed in a direction indicated by arrows attached thereto in FIG. 5.

In addition, in the case of this embodiment, when the clip 30 is assembled on to the boss 10, a state results in which the projecting portions 67 on the inner surfaces of the connecting portion 60 bite into only distal ends of the inner walls 15, 15 of the boss 10 (refer to FIG. 6) but do not bite into other portions on the boss 10 other than the inner walls 15, 15 (refer to FIG. 7 and an enlarged sectional view shown in association therewith). Consequently, since the individual projecting portions 67 on the inner surfaces of the connecting portion 60 press against locally the distal end portion of the two inner walls 15 of the boss 10 and bite into the distal end portion of the boss 10 in such a state that a pressure applied to the surface of the distal end portion of the boss 10 is increased, the clip 30 can be assembled on to the boss 10 more strongly and rigidly.

In addition, in the case of this embodiment, the notch 65 is provided on the front wall 61, and the cut hole 66 is provided on the rear wall 62 of the connecting portion 60. the front and rear walls 61, 62 face each other in the direction in which the boss 10 is held therebetween. Due to this, since when the clip 30 is assembled on to the boss 10, one side surface of the distal end portion of the boss 10 becomes visible through the notch 65, while the other side surface thereof becomes visible through the cut hole 66, whether or not the clip is assembled on to the boss 10 completely can be confirmed. Consequently, the assembling work of the clip 30 on to the boss 10 can be carried out in an ensured fashion, thereby making it possible to reduce the occurrence of assembling failures. Additionally, in the case of this embodiment, since the connecting portion 60 is formed into the frame shape which is made to open partially, a most distal end of the boss 10 becomes visible from the direction in which the boss 10 is inserted, thereby making it possible to confirm the assembled state of the clip 30 on to the boss 10.

Besides, the notch 65 may be provided on the rear wall 62, and the cut hole 66 may be provided on the front wall 61.

Furthermore, since the front and rear walls 61, 62 are connected together on both the sides thereof by the side walls 63, 63, the rigidity of the connecting portion 60 can be increased. As a result, the projecting portions 67 on the inner surfaces of the connecting portion 60 are allowed to bite into the distal end portion of the boss 10 effectively, and since once the projecting portions 67 bite into the boss 10, the projecting portions 67 are kept in engagement with the boss 10, the dislodgement of the clip 30 from the boss 10 can be prevented in such a state that the clip 30 is temporarily assembled on to the boss 10. In addition, when mounting the part 1 on the support part 5 or removing the part 1 from the part 5, while the elastic engagement pieces 50 of the clip 30 are deformed inwards, since the connecting portion 60 does not deform to ensure the maintenance of the engaged state, the dislodgement of the part 1 from the clip 30 an be prevented.

Figure 8:
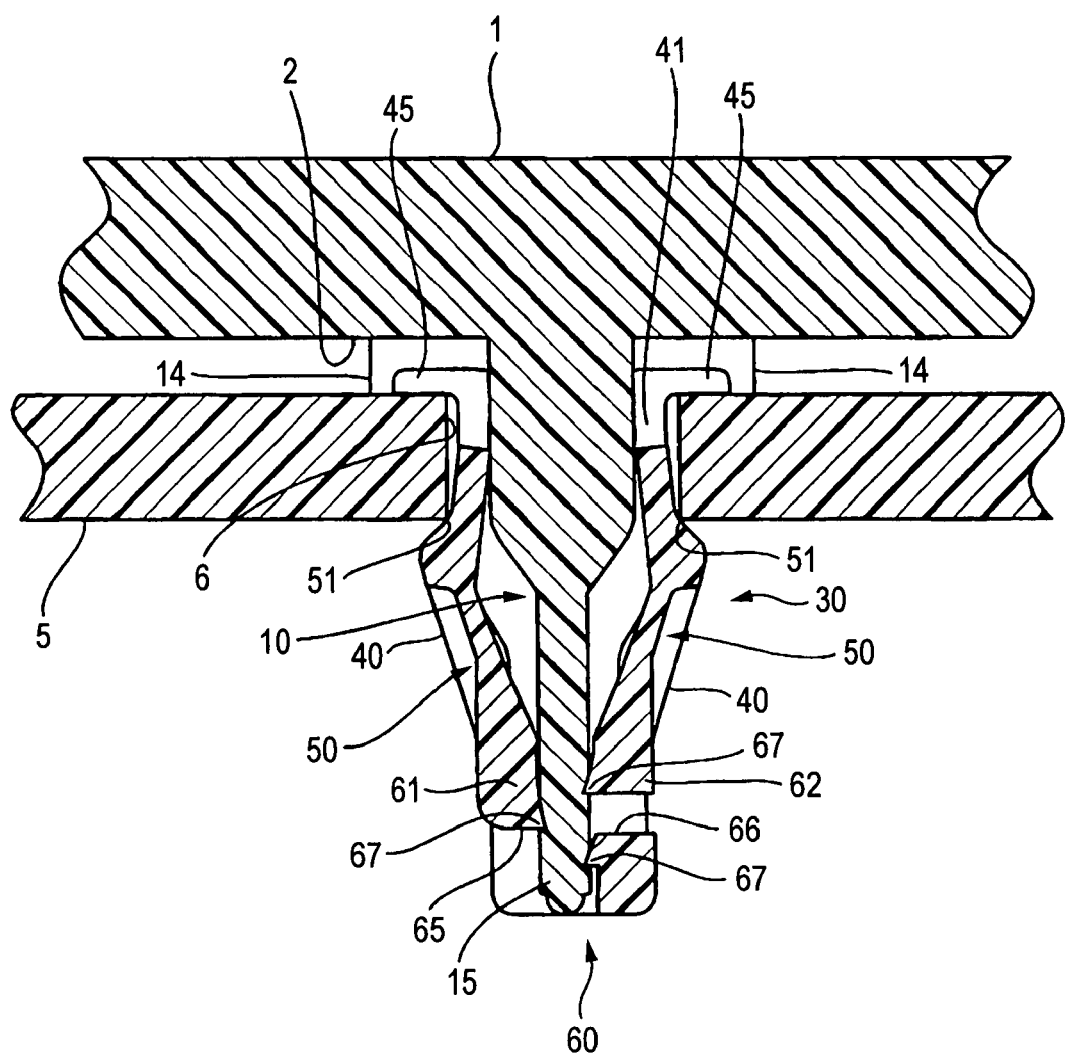
FIG. 8 is a sectional view showing a state in which a part is fixed to a support part using the part mounting mechanism from the front.

As is shown in FIG. 5, after the clip 30 has been assembled on to the boss 10, the boss 10 is inserted into the mounting hole 6 in the support part 5 along the inserting direction A2 (refer to FIG. 1) thereof. Then, the elastic engagement pieces 50 of the clip 30 are pressed against by the inner circumference of the mounting hole 6 to thereby be deflected inwards, and when the stepped portions 51 of the elastic engagement pieces 50 reach the mounting hole 6, the elastic engagement pieces 50 are elastically restored to be brought into engagement with the circumferential edge on the front surface of the mounting hole 6, and the shoulder portions 14 of the outer walls 13 of the boss 10 are brought into abutment with the circumferential edge on the front side of the mounting hole 6, whereby the clip 30 is mounted on the support part 5. As a result, as is shown in FIG. 8, the part 1 can be fixed to the support part 5 via the clip 30.

As this occurs, in the invention, since the resin clip 30 made from the resin material is adopted, for example, even in the event that the support part 5 is made up of a metallic panel member, the generation of uncomfortable rubbing noise when the clip 30 is inserted into the mounting hole 6 can be prevented.

Figure 9:
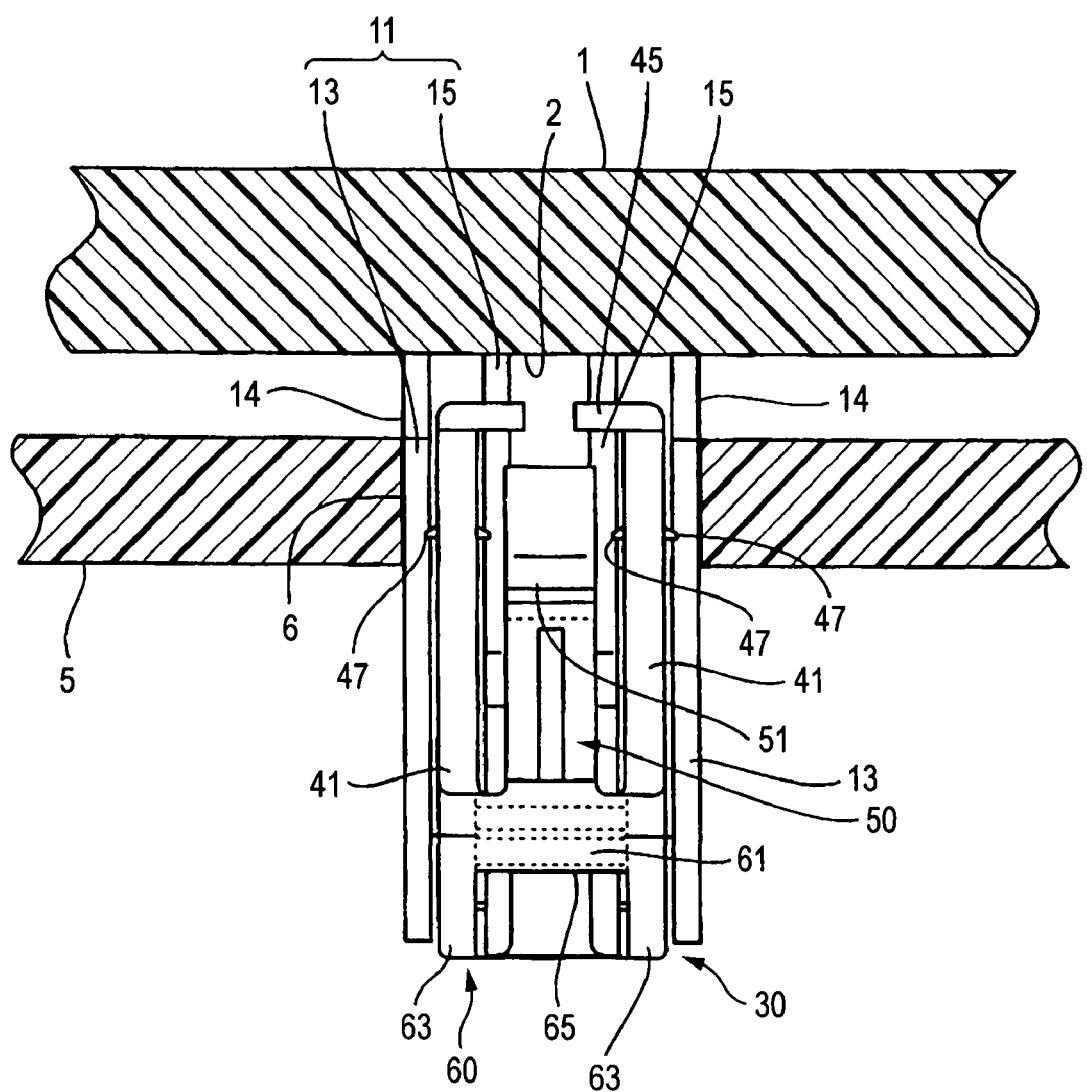
FIG. 9 is a sectional view showing a state in which the part is fixed to the support part using the part mounting mechanism from the side.

In addition, as is shown in FIG. 5, the respective piece elements 41 of the holding piece 40 which are being deflected outwards relative to the holding direction are, as with the elastic engagement piece 50, pressed against by the inner circumference of the mounting hole 6 to thereby be deflected inwards relative to the holding direction. As this occurs, in this embodiment, the projections 47, 47 are provided on both the sides of each piece element 41 in such a manner as to project therefrom to define the width D3 which is larger than the interval D1 between the outer wall 13 and the inner wall 15 of the boss 10. Due to this, as the piece element 41 is pressed against by the mounting hole 6 to thereby be deflected inwards, the piece element 41 is allowed to enter between the outer wall 13 and the inner wall 15, and as is shown in FIG. 9, the projections 47 on both the sides of the piece element 41 come to bite into the outer wall 13 and the inner wall 15, respectively. In this way, in the embodiment, since the clip 30 is made to bite into the distal end portion of the boss 10 by means of not only the projecting portions 67 on the inner surfaces of the connecting portion 60 but also the projections 47 at the proximal end of the boss 10, the clip 30 can be fixed to the boss 10 more strongly and rigidly.

In addition, since the pair of piece elements 41, 41 which make up each holding piece 40 of the clip 30 are made to be separated from each other at the distal ends thereof, the piece elements 41, 41 are made to be deflected independently from each other. Consequently, even in the event that there exists a dimensional variation in the positions of the outer walls 13 and the inner walls 15 of the boss 10, the variation can be absorbed to allow each piece element 41 to be inserted between the outer wall 13 and the inner wall 15 in an ensured fashion, so that the projections 47, 47 provided on both the sides thereof can be made to bite into the outer wall 13 and the inner wall 15, respectively.

Note that while in the case of this embodiment, the outer wall 13 and the inner wall 15 are formed into the rib-like walls which are formed relatively thin, the invention is not limited thereto, provided that they have wall shapes into which the projections 47 on the clip 30 are allowed to bite.

In addition, also when attempting to remove the part 1 from the support port 5, in this embodiment, since the clip 30 is made to bite into the distal end portion of the boss 10 strongly and rigidly by means of the projecting portions 67 provided on the inner surfaces of the connecting portion 60, the part 1 can be pulled out from the mounting hole 6 with the clip 30 assembled on the boss 10, an extremely good handling being thereby provided.

Note that while in this embodiment, the boss 10 is formed into the plate-like shape having the outer walls 13 and the inner walls 15, the invention is not limited thereto, and for example, the boss 10 may be formed into a post-like shape or a round rod-like shape, provided that the boss has a configuration in which the projection portions are allowed to bite into the boss.

What is claimed is:
1. A part mounting mechanism comprising:
a boss formed on a part; and
a resin clip which comprises a U-shape and is adapted to be assembled to the boss, the resin clip including:
holding pieces which hold the boss therebetween;
elastic engagement pieces which are inserted into a mounting hole that is formed in a support part on which the boss is to be mounted; and
a connecting portion which connects together proximal ends of the holding pieces and proximal ends of the elastic engagement pieces, the connecting portion including a front wall and a rear wall facing each other; and
a plurality of projecting portions including a projecting portion formed on the front wall and a projecting portion formed on the rear wall, the plurality of projecting portions being in a staggered fashion, such that the projecting portion formed on the front wall and the projecting portion formed on the rear wall do not overlap with each other in a direction in which the boss is inserted, wherein the resin clip comprises a resin material which comprises a hardness which is greater than a hardness of the boss, wherein a space defined between a distal end of a projecting portion of the plurality of projecting portions provided on one of the front wall and the rear wall and a distal end of another projecting portion of the plurality of projecting portions provided on the other of the front wall and the rear wall as viewed in the boss inserting direction, when the boss is not inserted, becomes smaller than a thickness of a distal end portion of the boss, and wherein, when the boss is inserted into the connecting portion, the plurality of projecting portions bite into the distal end portion of the boss.

2. The part mounting mechanism according to claim 1, further comprising:

a notch extending through one of the front wall and the rear wall of the connecting portion, the front and rear walls facing each other in a direction in which the boss is held therebetween;

a cut hole extending through another one of the front wall and the rear wall; and side walls for connecting sides of the front wall and the rear wall.

3. The part mounting mechanism according to claim 2, wherein the notch is disposed a distance from a distal end of the connecting portion different than a distance between the cut hole and the distal end of the connecting portion.

4. The part mounting mechanism according to claim 1, further comprising:

projections provided on side surfaces of the holding pieces which extend along a direction in which the boss is held therebetween; and a fixed wall provided on the boss, in a position where the projections are brought into sliding contact therewith when the resin clip deflects inwards;

wherein, when the resin clip is assembled on to the boss and is then inserted into the mounting hole in the support part, the holding pieces are pressed against by an inner circumference of the mounting hole to thereby be deflected inwards, such that the projections bite into the fixed wall provided on the boss.

5. The part mounting mechanism according to claim 1, wherein the plurality of projecting portions are disposed so as to be other than aligned with one another across the front wall and the rear wall.

6. The part mounting mechanism according to claim 1, wherein the plurality of projecting portions bite into the boss at an interval on a side of the boss which is different than an interval at which the plurality of projecting portions bite into the boss on another side of the boss.

7. The part mounting mechanism according to claim 1, wherein the boss further comprises outer walls and inner walls, and wherein a holding piece of the holding pieces is disposed between an outer wall of the outer walls and an inner wall of the inner walls.

8. The part mounting mechanism according to claim 1, wherein, when the boss is inserted into the connecting portion, the plurality of projecting portions are perpendicular to the projections.

9. A part mounting mechanism comprising:

a boss formed on a part; and a resin clip which comprises a u-shape and is adapted to be assembled to the boss, the resin clip including:

holding pieces which hold the boss therebetween;

elastic engagement pieces which are inserted into a mounting hole that is formed in a support part on which the boss is to be mounted; and a connecting portion which connects together proximal ends of the holding pieces and proximal ends of the elastic engagement pieces; and projecting portions formed on facing inner surfaces of the connecting portion at predetermined intervals in a staggered fashion along a direction in which the boss is inserted., wherein the resin clip comprises a resin material which comprises a hardness which is greater than a hardness of the boss, wherein a space defined between a distal end of a projecting portion of the projecting portions provided on an inner surface of the inner surfaces and a distal end of the projecting portion provided on another inner surface of the inner surfaces as viewed in the boss inserting direction, when the boss is not inserted, becomes smaller than a thickness of a distal end portion of the boss, wherein, when the boss is inserted into the connecting portion, the projecting portions bite into the distal end portion of the boss, wherein the fixed wall of the boss includes:

a pair of outer walls which are provided to erect along an axial direction of the boss; and a pair of inner walls which are provided inside the outer walls at predetermined intervals to erect in parallel to the outer walls, wherein the holding pieces are each made up of a pair of piece elements which are formed on both sides of a corresponding elastic engagement piece of the elastic engagement pieces via slits and whose distal ends are separated from each other, and projections are provided on both side surfaces of each of the pair of piece elements which extend in a direction in which the boss is held therebetween in such a manner as to project therefrom, such that a maximum width defined by the projections which project from the both side surfaces of each piece element, becomes greater than an interval between the outer wall and the inner wall, and wherein, when the resin clip is assembled on to the boss and is then inserted into the mounting hole in the support part, the respective piece elements of the holding pieces are pressed against to be deflected inwards and are allowed to enter between the outer walls and the inner walls of the boss, respectively, so that the projections on both the side surfaces of the individual element pieces bite into the outer walls and the inner walls of the boss, respectively.

* * * * *